UNITED STATES PATENT OFFICE.

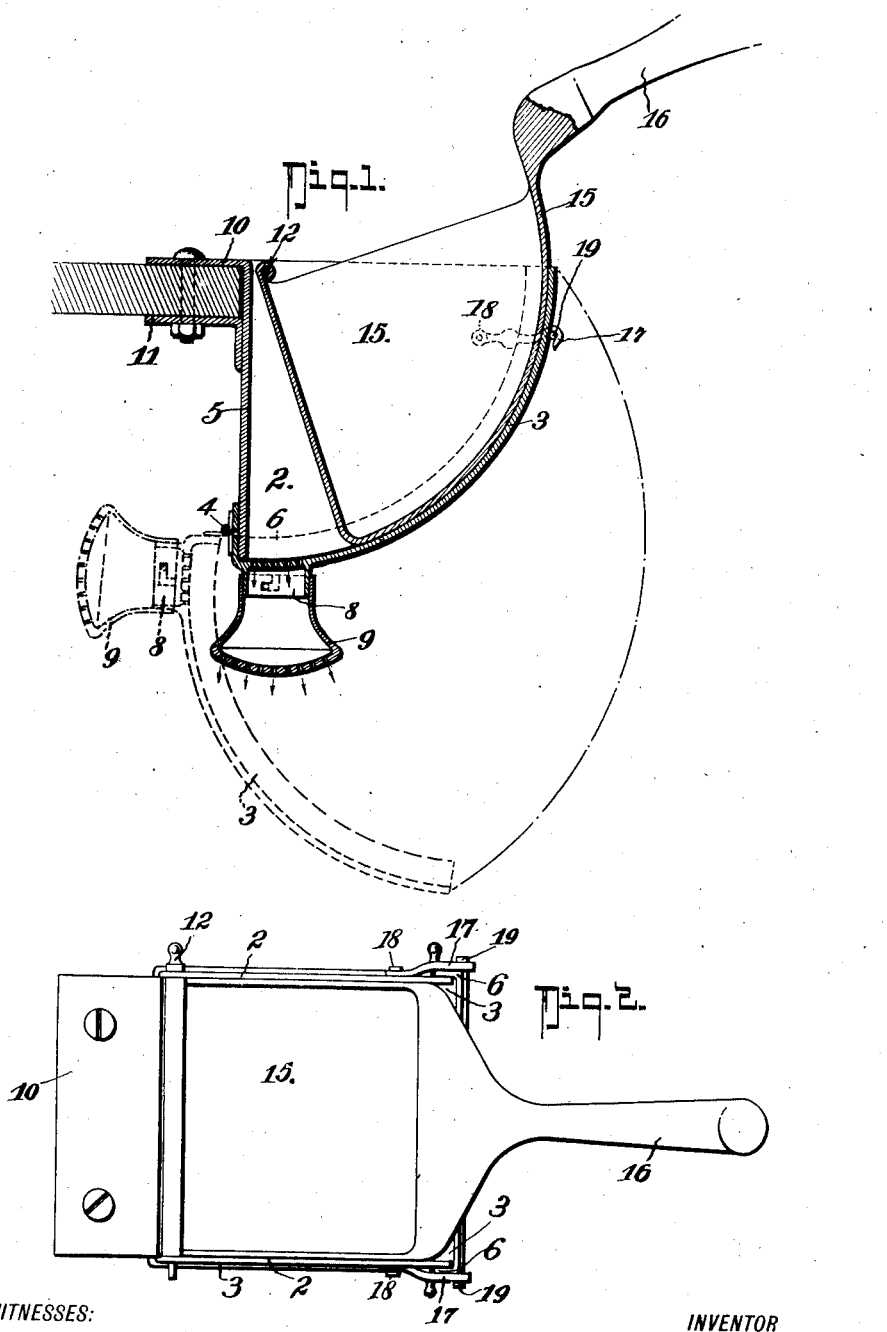

OTTO WEIS, OF VANCOUVER, BRITISH COLUMBIA, CANADA.

FRUIT-SQUEEZER.

1,107,230.  Specification of Letters Patent.  Patented Aug. 11, 1914.

Application filed May 1, 1914. Serial No. 835,721.

*To all whom it may concern:*

Be it known that I, OTTO WEIS, a citizen of the United States, residing at Vancouver, in the Province of British Columbia, Canada, have invented certain new and useful Improvements in Fruit-Squeezers, of which the following is a specification.

This invention relates to a squeezer for crushing the juice from fruit or the like and is particularly designed to provide a powerful device of this character which may be applicable to any kind of fruit and has provision whereby the juice is strained on delivery from it. Particular care has been taken to design the device so that it is readily accessible for purposes of cleansing.

The invention is particularly described in the following specification, reference being made to the drawings by which it is accompanied, in which:

Figure 1 is a vertical section through the device complete, and Fig. 2 is a plan.

The device comprises the combination with a fruit holding receptacle 2 which is rectangular in plan and in vertical cross section is shaped as a quarter of a circle. The outer curved wall 3 is hinged at 4 along the bottom edge to the back wall 5 and is flanged, as at 6, along its side edges to embrace the sides of the fruit receptacle and close the joint against leakage of the expressed juice therethrough. This curved outer wall 3 is retained in the closed position by hooks 17 pivotally connected at 18 to the sides of the container, which hooks engage pins 19 laterally projecting from the side edges of the front wall 3. In the midwidth of this curved outer wall 3 adjacent to the hinge 4, small apertures are provided in a circle through which the expressed juice delivers into a tubular socket 8 to which an enlarged finely perforated strainer 9 is connected by a bayonet clutch. This fruit container is secured to a table or counter by bolts through projections 10 and 11 from the back wall 5 where the attachment is to be relatively permanent for use in a hotel or a bar, and may be secured by wing headed screws where it is designed for domestic use.

Pivotally mounted at 12 to the upper back corner of the fruit receptacle is a strong squeezer member 15 which conforms closely to the inside dimensions of the fruit receptacle 2 and from the middle upper front of this squeezer member a handle lever 16 projects outward. The pivot pin 12 of this squeezing member is provided with a knob to facilitate its ready removal.

In use, the fruit from which the juice is to be expressed is placed in the receptacle 2 and the squeezer handle is by means of its handle pressed down, and the fruit is crushed against the back wall 5 with a powerful effort which effectively squeezes out all the juice. This juice runs freely through the apertures and through the socket 8 and is again more finely strained as it passes through strainer 9 into a glass or other vessel held beneath.

Not only is the device a powerful squeezer adapted for general application to any class of fruit or the like, but every facility is offered for readily cleaning it after use. The hinge pin 12 being removed the squeezer member 15 can be separately washed as also can the strainer 9 which is also detachable. The hooks 17 on each side which hold the curved front wall of the fruit container closed may be released and the front wall 3 lowered, rendering every part of the interior easily accessible for cleansing.

Having now particularly described my invention, I hereby declare that what I claim as new and desire to be protected in by Letters Patent, is:

1. A fruit squeezer, comprising a fruit holding receptacle having perforations in its bottom and the front wall of which is hinged adjacent to the bottom to the back and the edges of it flanged outside the sides, said perforations in the bottom of the receptacle delivering into an outlet pipe, means for retaining the front wall in the closed position, and a handle lever removably pivoted between the sides at the back upper corner of the receptacle said handle lever having a downwardly projecting portion conforming closely to the inside of the fruit receptacle.

2. A fruit squeezer, comprising a fruit holding receptacle which is substantially rectangular in plan and in side view is shaped as a segment of a circle, the curved outer wall of which receptacle is hinged along its bottom edge to the back and the edges of it flanged inward outside of the edges of the sides said curved wall having perforations adjacent to the hinge delivering into an outlet pipe, a strainer removably socketed on the end of this outlet pipe, means for retaining the curved front wall in the closed position, means for securing the receptacle to a table or the like, and a handle lever hinged to the back upper corner of the receptacle and having a segmental projection closely conforming to the dimensions of the fruit holding receptacle.

3. A fruit squeezer, comprising a fruit holding receptacle the front wall of which is hinged adjacent to the bottom and its edges flanged inward over those of the sides, means for holding this front wall in the closed position, said container having perforations in the bottom delivering into an outlet pipe, a strainer removably socketed outside the pipe, and a handle lever pivoted on a removable pin adjacent to the upper back corner of the container said handle lever having a portion projecting from its under side into the container which downwardly projected portion conforms closely to the form and dimensions of the container.

In testimony whereof I affix my signature in presence of two witnesses.

OTTO WEIS.

Witnesses:
   ROWLAND BRITTAIN,
   MAY WHYTE.